(12) United States Patent
Nozu et al.

(10) Patent No.: US 10,228,029 B2
(45) Date of Patent: Mar. 12, 2019

(54) DRIVING FORCE TRANSMISSION DEVICE CONTROL APPARATUS AND CONTROL METHOD

(71) Applicant: JTEKT CORPORATION, Osaka-shi (JP)

(72) Inventors: Tomohiro Nozu, Anjo (JP); Akira Kodama, Chiryu (JP); Shotaro Niimi, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 94 days.

(21) Appl. No.: 15/453,534

(22) Filed: Mar. 8, 2017

(65) Prior Publication Data

US 2017/0261049 A1 Sep. 14, 2017

(30) Foreign Application Priority Data

Mar. 14, 2016 (JP) .................................. 2016-050153

(51) Int. Cl.
*F16D 28/00* (2006.01)
*F16D 48/06* (2006.01)
(Continued)

(52) U.S. Cl.
CPC .......... *F16D 48/066* (2013.01); *F16D 13/52* (2013.01); *F16D 23/12* (2013.01); *F16D 25/08* (2013.01); *F16D 28/00* (2013.01); *F16D 48/064* (2013.01); *F16D 2023/123* (2013.01); *F16D 2500/1023* (2013.01); *F16D 2500/1024* (2013.01); *F16D 2500/1027* (2013.01);
(Continued)

(58) Field of Classification Search
None
See application file for complete search history.

(56) References Cited

U.S. PATENT DOCUMENTS 4,789,040 A * 12/1988 Morishita ............ B62D 5/0496
180/446
5,337,878 A * 8/1994 Mehlert .................. B66D 5/08
188/171
(Continued)

FOREIGN PATENT DOCUMENTS

JP 2015-116891 A 6/2015

*Primary Examiner* — Dirk Wright
(74) *Attorney, Agent, or Firm* — Oblon, McClelland, Maier & Neustadt, L.L.P.

(57) ABSTRACT

A control apparatus controls a driving force transmission device including: an electric motor; a pressing mechanism to convert the rotational force of the motor into an axial pressing force; friction clutches including friction members configured to come into frictional engagement with each other by the pressing force provided by the pressing mechanism. The driving force transmission device is configured to transmit a driving force between a pair of rotary members by the friction clutches. The apparatus includes: a target current calculating circuit to calculate a target current to be supplied to the motor; and a correction circuit to correct a voltage to be applied to the motor so as to reduce a difference between the target current and an actual current supplied to the motor. The correction circuit increases or reduces, in accordance with the actual current, the amount of correction of the voltage to be applied to the motor.

9 Claims, 11 Drawing Sheets

(51) Int. Cl.
*F16D 13/52* (2006.01)
*F16D 23/12* (2006.01)
*F16D 25/08* (2006.01)

(52) U.S. Cl.
CPC ............... *F16D 2500/1045* (2013.01); *F16D 2500/10412* (2013.01); *F16D 2500/3022* (2013.01); *F16D 2500/3028* (2013.01); *F16D 2500/7042* (2013.01); *F16D 2500/7061* (2013.01); *F16D 2500/70418* (2013.01)

(56) References Cited

U.S. PATENT DOCUMENTS

| | | | | |
|---|---|---|---|---|
| 6,860,361 B2* | 3/2005 | Takatsuka | ............ | B62D 5/0496 |
| | | | | 180/446 |
| 7,101,310 B2* | 9/2006 | Smith | .................... | F16D 48/06 |
| | | | | 318/433 |
| 7,522,984 B2* | 4/2009 | Karrelmeyer | ......... | F16D 48/064 |
| | | | | 701/67 |
| 8,251,873 B2* | 8/2012 | Zdych | .................... | F16D 48/06 |
| | | | | 477/175 |
| 8,256,593 B2* | 9/2012 | Kato | ....................... | F16D 25/02 |
| | | | | 192/35 |
| 8,897,981 B2* | 11/2014 | Meissner | ................ | F16D 25/14 |
| | | | | 701/68 |
| 9,243,673 B2* | 1/2016 | Kodama | .................. | F16D 23/12 |
| 9,388,866 B2* | 7/2016 | Chimner | .............. | F16D 48/066 |
| 10,054,174 B2* | 8/2018 | Langhanki | ............ | F16D 48/066 |
| 10,087,998 B2* | 10/2018 | Goossens | ................ | F16D 48/06 |
| 2017/0023075 A1* | 1/2017 | Nozu | .................... | F16D 48/066 |

* cited by examiner (FIRST EMBODIMENT)

(FIRST EMBODIMENT)

(FIRST EMBODIMENT)

(FIRST EMBODIMENT)

(FIRST EMBODIMENT)

(FIRST EMBODIMENT)

(FIRST EMBODIMENT)

(VARIATION OF FIRST EMBODIMENT)

(SECOND EMBODIMENT)

(SECOND EMBODIMENT)

(SECOND EMBODIMENT)

DRIVING FORCE TRANSMISSION DEVICE CONTROL APPARATUS AND CONTROL METHOD

INCORPORATION BY REFERENCE

The disclosure of Japanese Patent Application No. 2016-050153 filed on Mar. 14, 2016 including the specification, drawings and abstract is incorporated herein by reference in its entirety.

BACKGROUND OF THE INVENTION

1. Field of the Invention

The invention relates generally to driving force transmission device control apparatuses and control methods. More particularly, the invention relates to an apparatus and a method for controlling a driving force transmission device to transmit a driving force between a pair of rotary members by a friction clutch.

2. Description of the Related Art

Japanese Patent Application Publication No. 2015-116891 (JP 2015-116891 A), for example, discloses a driving force transmission device to transmit a driving force between a pair of rotary members by a friction clutch. Such a driving force transmission device is conventionally used to transmit a driving force for a vehicle, for example.

The driving force transmission device disclosed in JP 2015-116891 A includes: an electric motor; a decelerating mechanism to decelerate the rotation of the electric motor; a cam mechanism to be actuated by the decelerated rotational force of the electric motor; and a friction clutch to be pressed by an axial cam thrust produced by the actuation of the cam mechanism. The driving force transmission device transmits a driving force between rotary members using the frictional force of the friction clutch. The friction clutch is a multiplate wet clutch including a plurality of axially aligned clutch plates lubricated with lubricating oil so that sliding of the clutch plates is facilitated. The clutch plates receive the cam thrust from the cam mechanism so as to come into frictional engagement with each other.

The driving force transmission device is preferably configured to increase gaps between the clutch plates in order to reduce drag torque when the cam mechanism is not being actuated. Increasing the gaps between the clutch plates, however, increases the length of time required between the start of rotation of the electric motor and driving force transmission effected by the frictional engagement of the clutch plates of the friction clutch. In other words, the driving force transmission device will have reduced responsiveness.

To increase the responsiveness, a gain used for feedback control of the electric motor may be set at a high level. In such a case, however, self-excitation vibration and/or overshoot are/is likely to occur. Self-excitation vibration is a phenomenon where a driving force transmitted through the friction clutch changes in short cycles. Overshoot is a phenomenon where a driving force larger than a desired driving force is temporarily transmitted. Occurrence of self-excitation vibration and/or overshoot reduces the accuracy of the driving force to be transmitted.

SUMMARY OF THE INVENTION

An object of the invention is to provide driving force transmission device control apparatus and control method for controlling a driving force to be transmitted with high accuracy while preventing a reduction in responsiveness.

An aspect of the invention provides an apparatus for controlling a driving force transmission device. The driving force transmission device includes an electric motor, a pressing mechanism, and a friction clutch. The pressing mechanism is configured to convert a rotational force of the electric motor into an axial pressing force. The friction clutch includes a plurality of friction members configured to come into frictional engagement with each other by the pressing force provided by the pressing mechanism. The driving force transmission device is configured to transmit a driving force between a pair of first and second rotary members by the friction clutch. The apparatus includes a target current calculating circuit and a correction circuit. The target current calculating circuit is configured to calculate a target current to be supplied to the electric motor. The correction circuit is configured to correct a voltage to be applied to the electric motor so as to reduce a difference between the target current and an actual current supplied to the electric motor. The correction circuit increases or reduces, in accordance with the actual current supplied to the electric motor, an amount of correction of the voltage to be applied to the electric motor.

The driving force transmission device control apparatus according to the invention control the driving force to be transmitted with high accuracy while preventing a reduction in responsiveness of the driving force transmission device.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
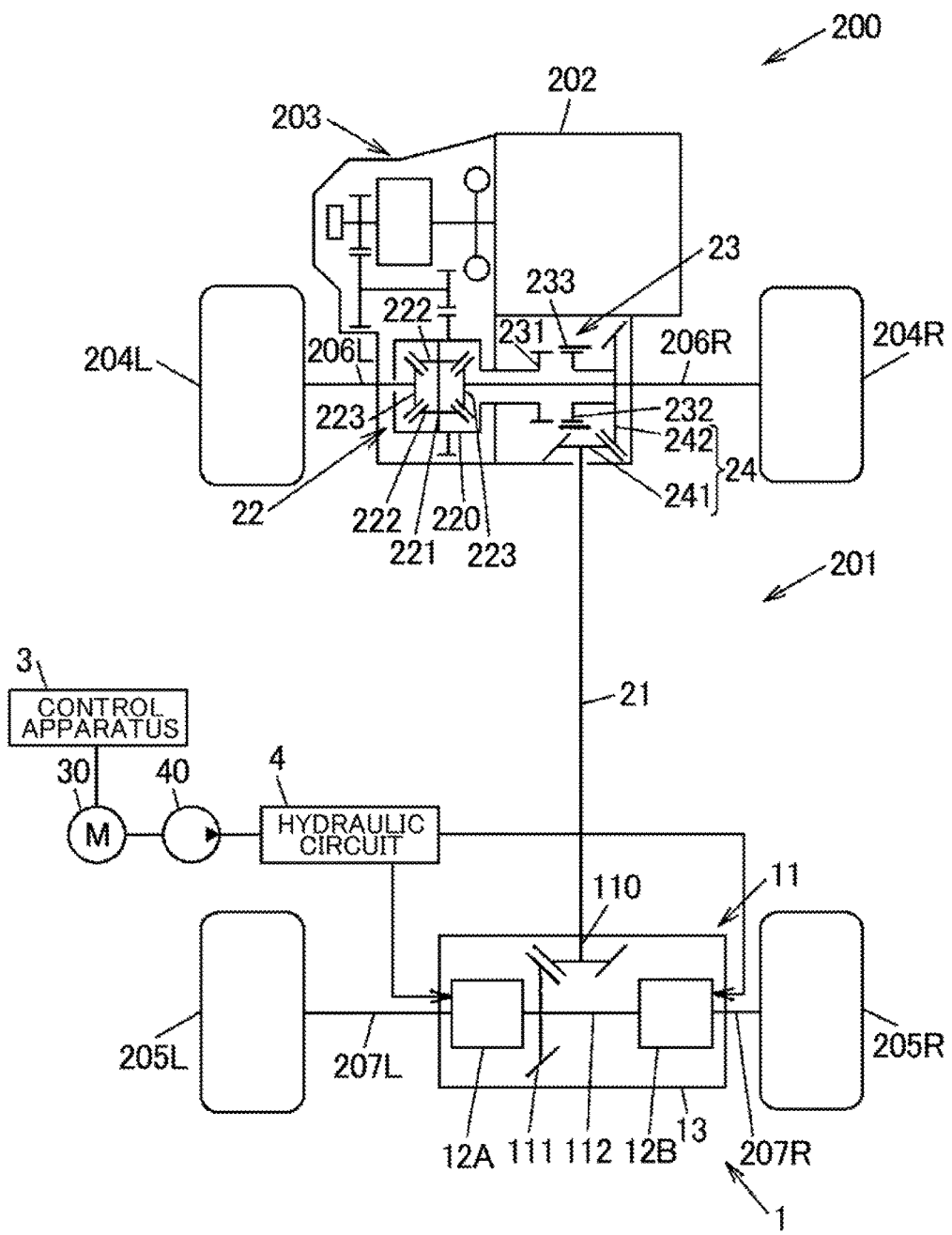
FIG. 1 is a diagram illustrating a schematic configuration of a four-wheel drive vehicle equipped with a driving force transmission device control apparatus according to a first embodiment of the invention.

A first embodiment of the invention will be described with reference to FIGS. 1 to 6B. FIG. 1 is a diagram illustrating a schematic configuration of a four-wheel drive vehicle 200 equipped with a driving force transmission device control apparatus 3 according to the first embodiment of the invention.

The four-wheel drive vehicle 200 includes: an engine 202 functioning as a driving source to generate a driving force for running of the four-wheel drive vehicle 200; a transmission 203; front wheels 204R and 204L serving as a pair of right and left main driving wheels; rear wheels 205R and 205L serving as a pair of right and left auxiliary driving wheels; a driving force transmission system 201 to transmit the driving force generated by the engine 202 to the front wheels 204R and 204L and the rear wheels 205R and 205L; and the control apparatus 3 to control a driving force transmission device 1 included in the driving force transmission system 201. The driving force transmission device 1 will be described below. In this embodiment, the reference signs R and L respectively represent right and left with respect to the direction in which the vehicle moves forward.

The four-wheel drive vehicle 200 is switchable between a four-wheel drive state where the driving force generated by the engine 202 is transmitted to the front wheels 204R and 204L and the rear wheels 205R and 205L and a two-wheel drive state where the driving force generated by the engine 202 is transmitted only to the front wheels 204R and 204L. In other words, the driving force generated by the engine 202 is transmitted to the front wheels 204R and 204L (i.e., the main driving wheels) in both of the two-wheel drive state and the four-wheel drive state, but the driving force generated by the engine 202 is transmitted to the rear wheels 205R and 205L (i.e., the auxiliary driving wheels) only in the four-wheel drive state.

Although this embodiment will be described on the assumption that the driving source is an internal combustion engine, the driving source may be any other engine. The driving source may be a combination of an engine and a high-power motor, such as an interior permanent magnet (IPM) synchronous motor, or may consist of a high-power motor.

The driving force transmission system 201 is disposed in a driving force transmission path between the transmission 203 and the rear wheels 205R and 205L of the four-wheel drive vehicle 200. The driving force transmission system 201 is installed on the body (not illustrated) of the four-wheel drive vehicle 200.

The driving force transmission system 201 includes the driving force transmission device 1, a propeller shaft 21, a front differential 22, a driving force interrupter 23, and a gear mechanism 24. The driving force transmission system 201 is configured to enable the four-wheel drive vehicle 200 to switch between the two-wheel drive state and the four-wheel drive state. The driving force interrupter 23 is disposed upstream of the propeller shaft 21 in the driving force transmission path. The driving force transmission device 1 is disposed downstream of the propeller shaft 21 in the driving force transmission path. In the four-wheel drive state, the driving force is transmitted from the driving force interrupter 23 to the propeller shaft 21 and is then transmitted to the rear wheels 205R and 205L through the driving force transmission device 1. In the two-wheel drive state, driving force transmission effected by the driving force interrupter 23 and driving force transmission effected by the driving force transmission device 1 are both interrupted, so that the driving force generated by the engine 202 is transmitted only to the front wheels 204R and 204L, resulting in the stoppage of the rotation of the propeller shaft 21.

The front differential 22 includes: a front differential case 220; a pinion shaft 221 that rotates together with the front differential case 220; a pair of pinion gears 222 pivotally supported by the pinion shaft 221; and a pair of first and second side gears 223 intermeshing with the pair of pinion gears 222, with the gear axes of the side gears 223 perpendicular to the gear axes of the pinion gears 222. The front differential 22 is disposed between the transmission 203 and the driving force interrupter 23. The first side gear 223 is connected to a front wheel axle shaft 206L, and the second side gear 223 is connected to a front wheel axle shaft 206R.

The driving force interrupter 23 includes: a first gear 231 that rotates together with the front differential case 220; a second gear 232 disposed coaxially side by side with the first gear 231; and a cylindrical sleeve 233 to connect the first gear 231 and second gear 232 to each other. The sleeve 233 is axially movable by an actuator (not illustrated) between a connecting position where the sleeve 233 intermeshes with both of the first gear 231 and the second gear 232 and a non-connecting position where the sleeve 233 intermeshes with the second gear 232 but does not intermesh with the first gear 231. At the connecting position, the sleeve 233 connects the first gear 231 and the second gear 232 to each other so that the first gear 231 and the second gear 232 rotate together transmitting the driving force between the first gear 231 and the second gear 232. At the non-connecting position, the sleeve 233 interrupts driving force transmission between the first gear 231 and the second gear 232.

The front wheel gear mechanism 24 is disposed on the front wheel side end of the propeller shaft 21. The gear mechanism 24 includes a drive pinion 241 and a ring gear 242 intermeshing with each other. The drive pinion 241 is connected to the front end of the propeller shaft 21. The ring gear 242 is connected to the second gear 232 so that the ring gear 242 rotates together with the second gear 232. The ring gear 242 intermeshes with the drive pinion 241, with the gear axis of the ring gear 242 perpendicular to the gear axis of the drive pinion 241.

The configuration of the driving force transmission device 1 will be described below. As illustrated in FIG. 1, the driving force transmission device 1 includes: a rear wheel gear mechanism 11 to which a driving force is transmitted from the propeller shaft 21; first and second friction clutches 12A and 12B to adjust the driving force transmitted from the gear mechanism 11 and transmit the adjusted driving force to axle shafts 207R and 207L; a housing 13 that houses the first and second friction clutches 12A and 12B and the gear mechanism 11; an electric motor 30 to actuate the first and second friction clutches 12A and 12B; a hydraulic pump 40; and a hydraulic circuit 4.

The gear mechanism 11 includes: a pinion gear 110; a ring gear 111 intermeshing with the pinion gear 110, with the gear axis of the ring gear 111 perpendicular to the gear axis of the pinion gear 110; and a center shaft 112 that rotates together with the ring gear 111. The center shaft 112 has a rotation axis parallel to the width direction of the four-wheel drive vehicle 200. The center shaft 112 rotates upon receiving a rotational force from the propeller shaft 21 through the ring gear 111. The first friction clutch 12A is disposed between the center shaft 112 and the rear wheel axle shaft 207L. The second friction clutch 12B is disposed between the center shaft 112 and the rear wheel axle shaft 207R.

Figure 2:
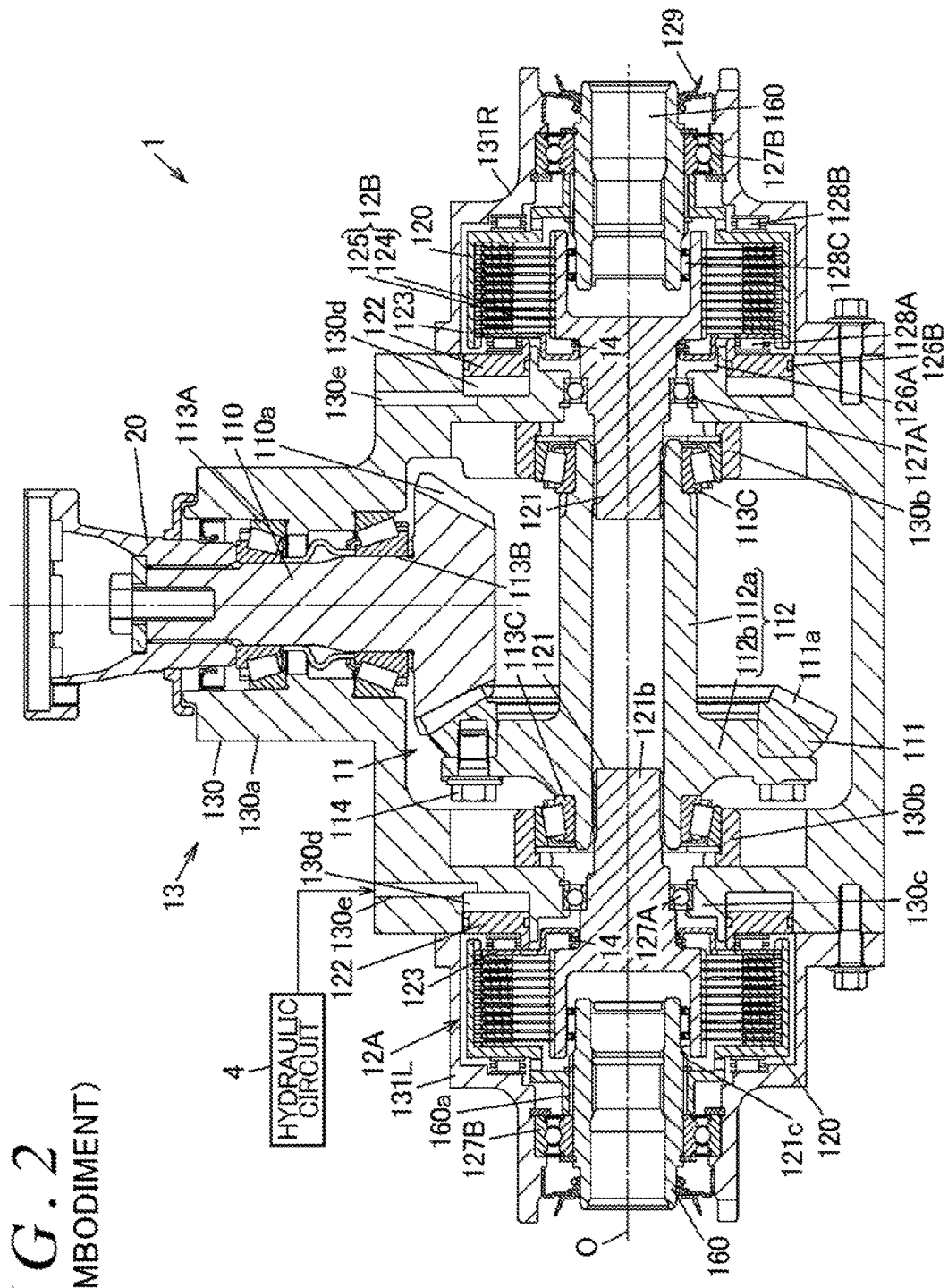
FIG. 2 is a cross-sectional view of a specific example of the structure of the driving force transmission device.
Figure 3:
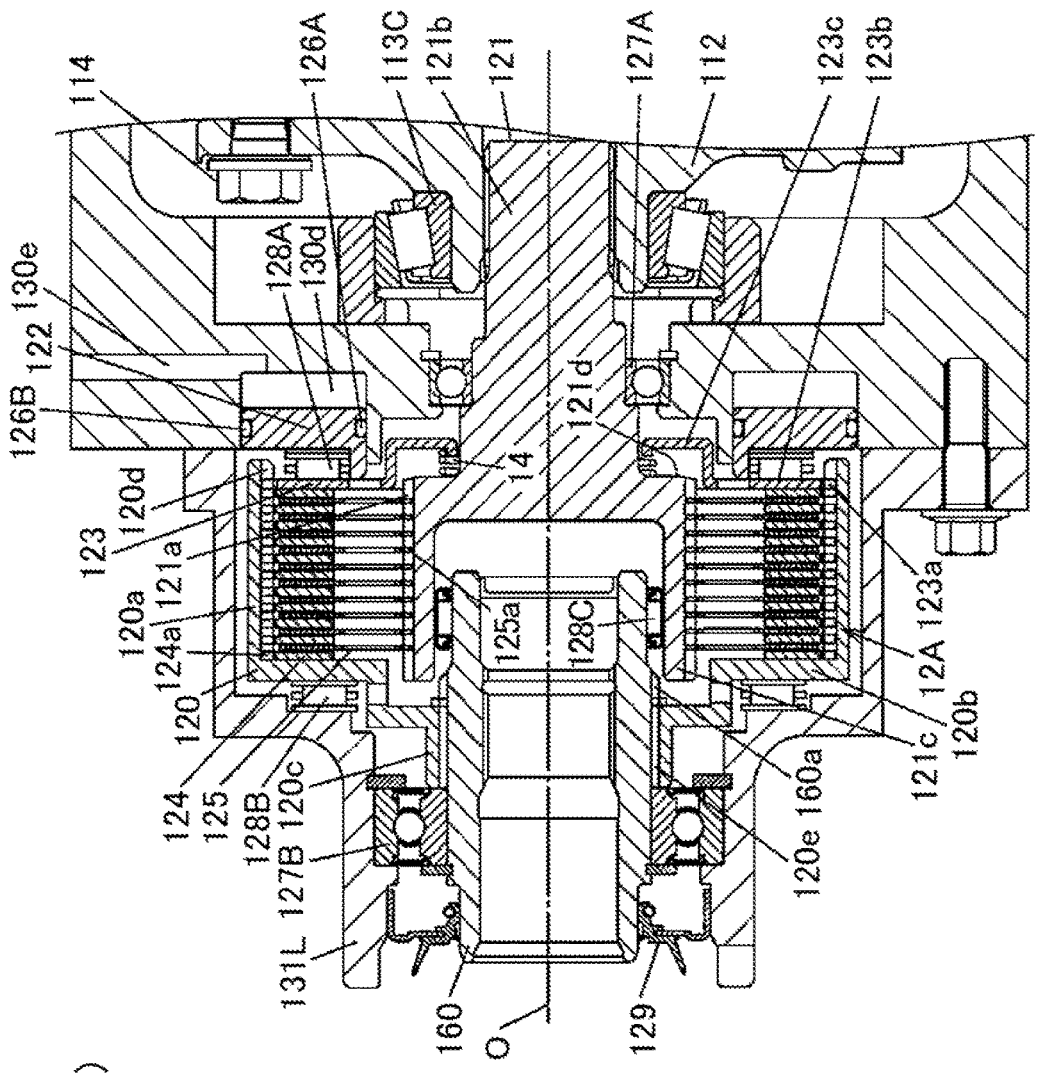
FIG. 3 is a sectional view of a first friction clutch and components adjacent thereto.

FIG. 2 is a sectional view of a specific example of the structure of the driving force transmission device 1. FIG. 3 is a cross-sectional view of the first friction clutch 12A and components adjacent thereto.

As illustrated in FIG. 2, the driving force transmission device 1 includes the gear mechanism 11, the first and second friction clutches 12A and 12B, and the housing 13. The pinion gear 110 of the gear mechanism 11 is connected to the propeller shaft 21 through a connector 20. The driving force transmission device 1 further includes a pair of right and left clutch housings 120, a pair of right and left inner shafts 121, and a pair of right and left connecting shafts 160. The right clutch housing 120 houses the second friction clutch 12B. The left clutch housing 120 houses the first friction clutch 12A. The inner shafts 121 are coaxial with the clutch housings 120 and supported such that the inner shafts 121 are rotatable relative to each other. The right connecting shaft 160 connects the right clutch housing 120 to the rear wheel axle shaft 207R such that the right clutch housing 120 and the axle shaft 207R are not rotatable relative to each other. The left connecting shaft 160 connects the left clutch housing 120 to the rear wheel axle shaft 207L such that the left clutch housing 120 and the axle shaft 207L are not rotatable relative to each other. Each clutch housing 120 and the inner shaft 121 associated thereto are an example of "a pair of first and second rotary members" according to the invention.

The housing 13 includes a center housing member 130, a side housing member 131R, and a side housing member 131L. The center housing member 130 houses the pinion gear 110, the ring gear 111, and the center shaft 112 of the gear mechanism 1. The side housing member 131R houses the second friction clutch 12B. The side housing member 131L houses the first friction clutch 12A. The center housing member 130, the side housing member 131R, and the side housing member 131L are secured to each other by bolting. Lubricating oil (not illustrated) is sealed in the housing 13 so as to facilitate gear intermeshing of the gear mechanism 11 and frictional sliding of the first and second friction clutches 12A and 12B.

The center housing member 130 includes: a first holder 130a holding the pinion gear 110 of the gear mechanism 11 via tapered roller bearings 113A and 113B such that the pinion gear 110 is rotatable; a second holder 130b holding the center shaft 112 of the gear mechanism 11 via a tapered roller bearing 113C such that the center shaft 112 is rotatable; a third holder 130c holding the pair of right and left inner shafts 121 via ball bearings 127A such that the inner shafts 121 are rotatable; and a pair of cylinders 130d each housing a piston 122 (which will be described below) such that each piston 122 is movable back and forth. The pair of cylinders 130d are provided on the ends of the center housing member 130 in the vehicle width direction. The right cylinder 130d has an opening facing the side housing member 131R. The left cylinder 130d has an opening facing the side housing member 131L.

The center shaft 112 integrally includes: a cylindrical portion 112a extending along a rotation axis O of the center shaft 112; and a flange 112b protruding radially outward from an end of the cylindrical portion 112a. The ring gear 111 is provided with a plurality of intermeshing teeth 111a configured to intermesh with a gear portion 110a of the pinion gear 110. The ring gear 11 is secured to the flange 112b of the center shaft 112 with bolt(s) 114.

The first and second friction clutches 12A and 12B each include: a plurality of outer clutch plates 124 in engagement with the associated clutch housing 120 such that the outer clutch plates 124 are axially movable but not rotatable relative to the associated clutch housing 120; and a plurality of inner clutch plates 125 in engagement with the associated inner shaft 121 such that the inner clutch plates 125 are axially movable but not rotatable relative to the associated inner shaft 121. The outer clutch plates 124 and the inner clutch plates 125 are disposed alternately in a direction parallel to the rotation axis O of the center shaft 112. The outer clutch plates 124 and the inner clutch plates 125 are pressed by pressing members 123 that receive pressing forces from the pistons 122. This means that movement of the pistons 122 through the cylinders 130d applies pressing forces to the first and second friction clutches 12A and 12B.

Friction materials, such as paper materials, are affixed to the surfaces of the inner clutch plates 125 facing the outer clutch plates 124. Surfaces of the outer clutch plates 124 facing the inner clutch plates 125 are each provided with an oil groove through which lubricating oil flows. Each oil groove is formed in a grid pattern, for example. Each of the first and second friction clutches 12A and 12B is a multiplate wet clutch that facilitates frictional sliding of the outer clutch plates 124 and the inner clutch plates 125 with lubricating oil.

The first and second friction clutches 12A and 12B are pressed by the pressing members 123, thus producing frictional forces between the outer clutch plates 124 and the inner clutch plates 125. Each of the outer clutch plates 124 and the inner clutch plates 125 is an example of a "friction member" according to the invention.

Each clutch housing 120 includes: a cylindrical portion 120a having an opening facing the associated piston 122; a receiver 120b that extends inward from an end of the cylindrical portion 120a opposite to the associated piston 122 and receives the pressing force from the associated piston 122 through an associated one of the first and second friction clutches 12A and 12B; and a tubular connection 120c that extends inward from the receiver 120b and is connected to the associated connecting shaft 160. The inner surface of each cylindrical portion 120a is provided with a straight spline-fitted portion 120d. The inner surface of each connection 120c is provided with a spline-fitted portion 120e spline-fitted to a spline-fitted portion 160a on the outer peripheral surface of the associated connecting shaft 160. Thus, each clutch housing 120 is connected to the associated connecting shaft 160 such that each clutch housing 120 is not rotatable relative to the associated connecting shaft 160.

A needle roller bearing 128B is disposed between the receiver 120b of each clutch housing 120 and an associated one of the side housing members 131R and 131L.

Each inner shaft 121 includes: a columnar shaft portion 121b; and a cylindrical portion 121c housing one end of the associated connecting shaft 160. The front end of each shaft portion 121b is connected to the center shaft 112 by spline fitting such that each shaft portion 121b is not rotatable relative to the center shaft 112. A needle roller bearing 128C is disposed between the inner peripheral surface of each cylindrical portion 121c and the outer peripheral surface of the associated connecting shaft 160. A ball bearing 127B and a seal 129 are disposed between the outer peripheral surface of each connecting shaft 160 and the inner peripheral surface of an opening-defining end of an associated one of the side housing members 131R and 131L.

Each piston 122 receives, within the associated cylinder 130d of the center housing member 130, oil pressure of hydraulic oil supplied from the hydraulic circuit 4, and produces an axial pressing force that brings the outer clutch plates 124 and the inner clutch plates 125 into frictional engagement with each other. Each cylinder 130d functions as an oil pressure chamber that causes the oil pressure of hydraulic oil to be exerted on the associated piston 122. The center housing member 130 is provided with supply flow passages 130e. The hydraulic oil supplied from the hydraulic circuit 4 is guided to each cylinder 130d through the associated supply flow passage 130e. Seals 126A and 126B are respectively disposed on the inner and outer peripheral surfaces of each piston 122.

Each of the first and second friction clutches 12A and 12B is disposed between the receiver 120b of the associated clutch housing 120 and the associated pressing member 123. Upon receiving through a needle roller bearing 128A the force of movement of the associated piston 122 that has received the pressure of hydraulic oil, each pressing member 123 moves axially toward the associated receiver 120b so as to press an associated one of the first and second friction clutches 12A and 12B. The pressing forces from the pressing members 123 bring the outer clutch plates 124 into frictional engagement with the inner clutch plates 125, so that each of the first and second friction clutches 12A and 12B transmits the driving force between the associated inner shaft 121 and the associated clutch housing 120. Consequently, the driving force generated by the engine 202 is transmitted to the rear wheels 205R and 205L through the first and second friction clutches 12A and 12B.

When the pistons 122 receive no oil pressure of hydraulic oil, the outer clutch plates 124 and the inner clutch plates 125 of each of the first and second friction clutches 12A and 12B are rotatable relative to each other. In this case, the first and second friction clutches 12A and 12B interrupt transmission of the driving force from the engine 202 to the rear wheels 205R and 205L.

As illustrated in FIG. 3, the outer clutch plates 124 each include, on its outer periphery, a spline protrusion 124a. Each spline protrusion 124a is in engagement with the straight spline-fitted portion 120d of the associated clutch housing 120. The inner clutch plates 125 each include, on its inner periphery, a spline protrusion 125a. Each spline protrusion 125a is in engagement with a straight spline-fitted portion 121a on the outer peripheral surface of the associated inner shaft 121. The outer clutch plates 124 are connected to the associated clutch housing 120 such that the outer clutch plates 124 are axially movable but not rotatable relative to the associated clutch housing 120. The inner clutch plates 125 are connected to the associated inner shaft 121 such that the inner clutch plates 125 are axially movable but not rotatable relative to the associated inner shaft 121.

Each pressing member 123 is an annular ring plate. Each pressing member 123 includes, on its outer periphery, a spline protrusion 123a in engagement with the straight spline-fitted portion 120d of the associated clutch housing 120. Each pressing member 123 is connected to the associated clutch housing 120 such that each pressing member 123 is axially movable but not rotatable relative to the associated clutch housing 120. Each pressing member 123 further includes: a presser 123b that faces the associated needle roller bearing 128A and applies a pressing force to an associated one of the first and second friction clutches 12A and 12B; and an extension 123c extended inward from the presser 123b. Each presser 123b is interposed between the associated needle roller bearing 128A and the outer clutch plate 124 closest to the opening of the associated clutch housing 120.

A coil spring 14 is fitted onto each inner shaft 121. A first end of each coil spring 14 abuts against the extension 123c of the associated pressing member 123. A second end of each coil spring 14 abuts against a step 121d of the associated inner shaft 121. Each coil spring 14 is disposed between the associated step 121d and the extension 123c of the associated pressing member 123, with the coil spring 14 axially compressed therebetween. Thus, each pressing member 123 is urged away from the receiver 120b of the associated clutch housing 120 by the restoring force of the associated coil spring 14.

Hydraulic oil, i.e., a working fluid, is supplied from the hydraulic circuit 4 to the pair of cylinders 130d. More specifically, hydraulic oil is discharged from the hydraulic pump 40 driven by the electric motor 30 and is supplied to the hydraulic circuit 4 and then to the pair of cylinders 130d. Upon receiving a motor current from the control apparatus 3, the electric motor 30 drives the hydraulic pump 40. The discharge pressure of the hydraulic pump 40 increases as the number of revolutions of the electric motor 30 increases. The electric motor 30 is a brushless DC motor, for example. Alternatively, the electric motor 30 may be a brush DC motor. The electric motor 30 may be a motor with a built-in speed reducer. The hydraulic pump 40 may be an external gear pump, an internal gear pump, or a vane pump.

Figure 4:
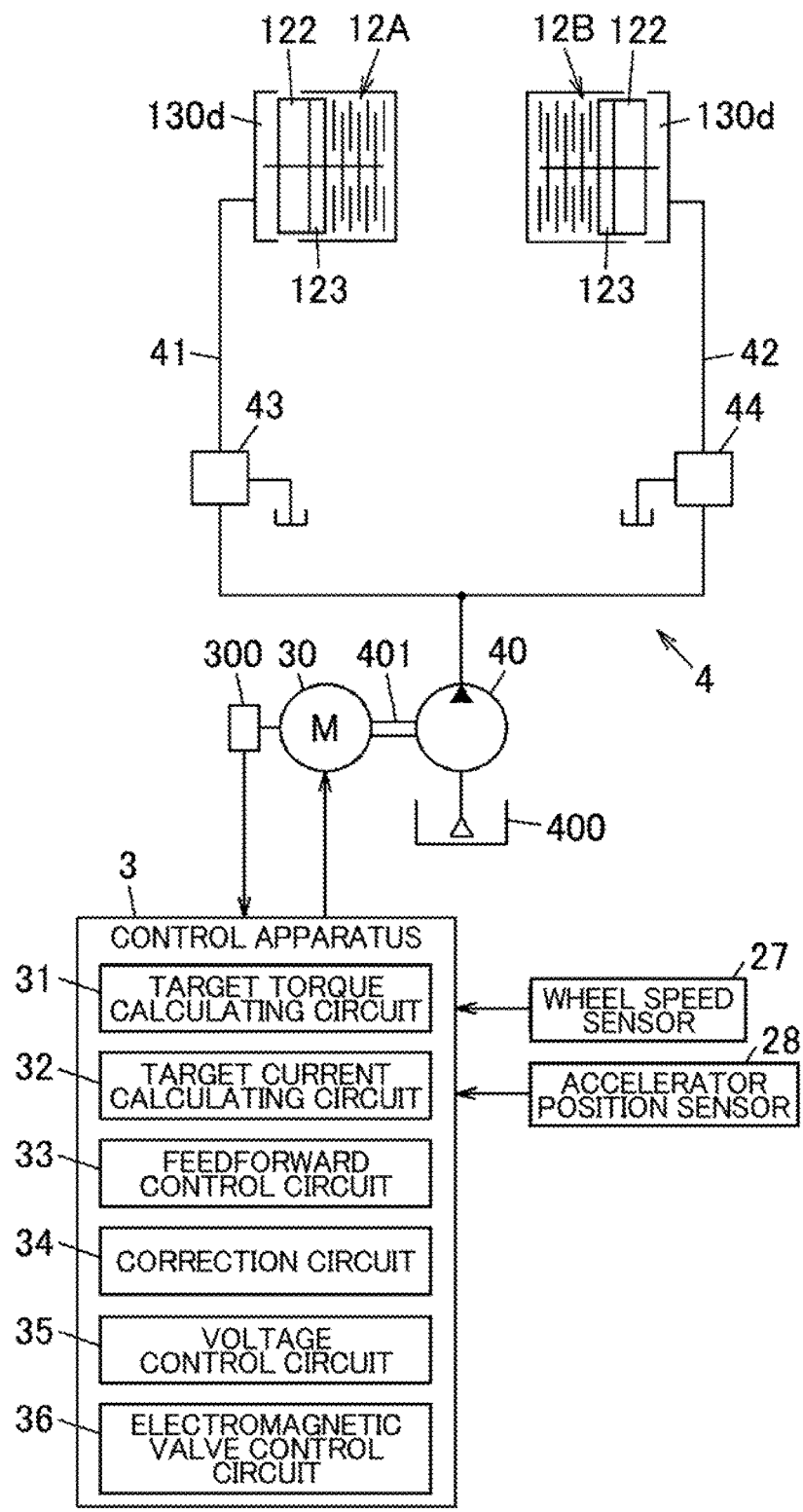
FIG. 4 is a diagram schematically illustrating the configurations of the control apparatus and a hydraulic circuit.

FIG. 4 is a diagram schematically illustrating the configurations of the control apparatus 3 and the hydraulic circuit 4. The hydraulic circuit 4 includes: a first pipe 41 through which hydraulic oil is supplied to the cylinder 130d containing the piston 122 to press the first friction clutch 12A; a second pipe 42 through which hydraulic oil is supplied to the cylinder 130d containing the piston 122 to press the second friction clutch 12B; a first electromagnetic valve 43 provided in the first pipe 41; and a second electromagnetic valve 44 provided in the second pipe 42. The hydraulic oil discharged from the hydraulic pump 40 is supplied to the pair of cylinders 130d through the first pipe 41 and the second pipe 42.

Each of the first electromagnetic valve 43 and the second electromagnetic valve 44 is a proportional control valve whose degree of opening changes in accordance with a current supplied from the control apparatus 3. The pressure inside the cylinder 130d associated with the first friction clutch 12A increases as the current supplied to the first electromagnetic valve 43 increases. The pressure inside the cylinder 130d associated with the second friction clutch 12B increases as the current supplied to the second electromagnetic valve 44 increases. Thus, the first electromagnetic valve 43 adjusts the pressure of the hydraulic oil in the cylinder 130d associated with the first friction clutch 12A, and the second electromagnetic valve 44 adjusts the pressure of the hydraulic oil in the cylinder 130d associated with the second friction clutch 12B.

The control apparatus 3 controls the electric motor 30 so that the discharge pressure of the hydraulic pump 40 is slightly higher than the oil pressure of the hydraulic oil to be supplied to each cylinder 130d associated with one of the first and second friction clutches 12A and 12B. The control apparatus 3 controls the first and second electromagnetic valves 43 and 44 so as to reduce the discharge pressure of the hydraulic pump 40 when the hydraulic oil is supplied to each cylinder 130d associated with one of the first and second friction clutches 12A and 12B.

A rotor of the electric motor 30 is connected with a pump shaft 401 of the hydraulic pump 40. The hydraulic pump 40 is actuated by the rotational force of the electric motor 30 transmitted through the pump shaft 401, so that the hydraulic pump 40 sucks hydraulic oil stored in a reservoir 400. Excess hydraulic oil discharged from the first and second electromagnetic valves 43 and 44 is returned to the reservoir 400. The motor current supplied from the control apparatus 3 to the electric motor 30 is detected by a current sensor 300. The control apparatus 3 controls the electric motor 30 on the basis of an actual current detected by the current sensor 300.

As used herein, the term "actual current" refers to a current actually supplied to the electric motor 30.

The hydraulic pump 40, the hydraulic circuit 4, and the pistons 122 constitute a pressing mechanism to convert the rotational force of the electric motor 30 into an axial pressing force. The first and second friction clutches 12A and 12B each receive the pressing force provided by the pressing mechanism. This results in frictional engagement of the outer clutch plates 124 with the inner clutch plates 125.

The control apparatus 3 includes a target torque calculating circuit 31, a target current calculating circuit 32, a feedforward control circuit 33, a correction circuit 34, a voltage control circuit 35, and an electromagnetic valve control circuit 36. A CPU (not illustrated) executes program(s) stored in advance in a memory, thus implementing each of these circuits.

The target torque calculating circuit 31 calculates a torque (or driving force) to be transmitted by the first and second friction clutches 12A and 12B. This calculation is performed for each of the first and second friction clutches 12A and 12B on the basis of values detected by a wheel speed sensor 27 and an accelerator position sensor 28, for example. The wheel speed sensor 27 detects the rotational speed of the front wheels 204R and 204L and the rotational speed of the rear wheels 205R and 205L. The accelerator position sensor 28 detects the position of an accelerator operated by a driver. Specifically, the greater the difference between the rotational speed of the front wheels 204R and 204L and the rotational speed of the rear wheels 205R and 205L detected by the wheel speed sensor 27 or the larger the value indicative of the accelerator position detected by the accelerator position sensor 28, the higher the torque (i.e., the target torque) to be transmitted by the first and second friction clutches 12A and 12B.

In accordance with the target torque calculated by the target torque calculating circuit 31, the target current calculating circuit 32 calculates the current value of a motor current (i.e., a target current) to be supplied to the electric motor 30. The target current calculated is the current value of a motor current that causes the first and second friction clutches 12A and 12B to transmit the target torque calculated by the target torque calculating circuit 31.

On the basis of the target current calculated by the target current calculating circuit 32, the feedforward control circuit 33 calculates a command value for a voltage (i.e., a command voltage) to be applied to the electric motor 30. The command voltage is a feedforward controlled variable. The command voltage calculated is a value obtained by multiplying the direct current resistance of a winding of the electric motor 30 by the target current, for example.

The correction circuit 34 corrects the voltage to be applied to the electric motor 30 so as to reduce the difference between the target current calculated by the target current calculating circuit 32 and the actual current supplied to the electric motor 30. Specifically, the correction circuit 34 makes a comparison between the target current calculated by the target current calculating circuit 32 and the actual current detected by the current sensor 300. When the comparison indicates that the actual current is lower than the target current, the correction circuit 34 increases the command voltage. When the comparison indicates that the actual current is higher than the target current, the correction circuit 34 reduces the command voltage.

In this embodiment, the correction circuit 34 corrects the voltage to be applied to the electric motor 30 by carrying out proportional-integral-derivative (PID) control that is a type of feedback control. PID control is a control method that involves using three values, i.e., a difference between a target value and an actual value, the integral of the difference, and the derivative value of the difference, so as to bring the actual value close to the target value. More specifically, PID control involves simultaneously carrying out proportional control based on a difference between a target value and an actual value, integral control based on the integral of the difference, and derivative control based on the derivative value of the difference.

In this embodiment, the correction circuit 34 increases or reduces, in accordance with the actual current supplied to the electric motor 30, the amount of correction of the voltage to be applied to the electric motor 30. This means that if the difference between the target current and the actual current supplied to the electric motor remains the same, the amount of correction effected by PID control will vary depending on the value of the actual current supplied to the electric motor 30, so that the amount of correction of the voltage to be applied to the electric motor 30 will increase as the actual current decreases. Thus, supposing that the difference is small, the voltage to be applied to the electric motor 30 when the actual current is low will change more greatly than when the actual current is high.

More specifically, the correction circuit 34 increases or reduces gains for feedback control in accordance with the actual current supplied to the electric motor 30. In this embodiment, the correction circuit 34 performs PID control. Thus, as the actual current supplied to the electric motor 30 decreases, the correction circuit 34 increases a proportional gain for proportional control, an integral gain for integral control, and a derivative gain for derivative control. Effects achieved by increasing or reducing the gains in this manner will be described below.

The voltage control circuit 35 pulse-width modulates the voltage (12 V) of a battery (e.g., a storage battery) installed on the four-wheel drive vehicle 200 and thus applies a voltage responsive to the command voltage to the electric motor 30. The voltage control circuit 35 increases the duty ratio for pulse width modulation as the command voltage increases, and reduces the duty ratio for pulse width modulation as the command voltage decreases.

The electromagnetic valve control circuit 36 supplies a control current to each of the first and second electromagnetic valves 43 and 44 so as to control the first and second electromagnetic valves 43 and 44. As previously mentioned, the control apparatus 3 controls the electric motor 30 so that the discharge pressure of the hydraulic pump 40 is slightly higher than the oil pressure of the hydraulic oil to be supplied to each cylinder 130d. Thus, each of the first and second electromagnetic valves 43 and 44 makes a fine adjustment to the pressure inside the associated cylinder 130d. This makes it possible to accurately control the driving force to be transmitted by the first and second friction clutches 12A and 12B. Suppose that when the four-wheel drive vehicle 200 makes a turn, for example, a difference is made between the driving force transmitted by the first friction clutch 12A and the driving force transmitted by the second friction clutch 12B. In such a case, different control currents are supplied to the first electromagnetic valve 43 and the second electromagnetic valve 44.

Figure 5:
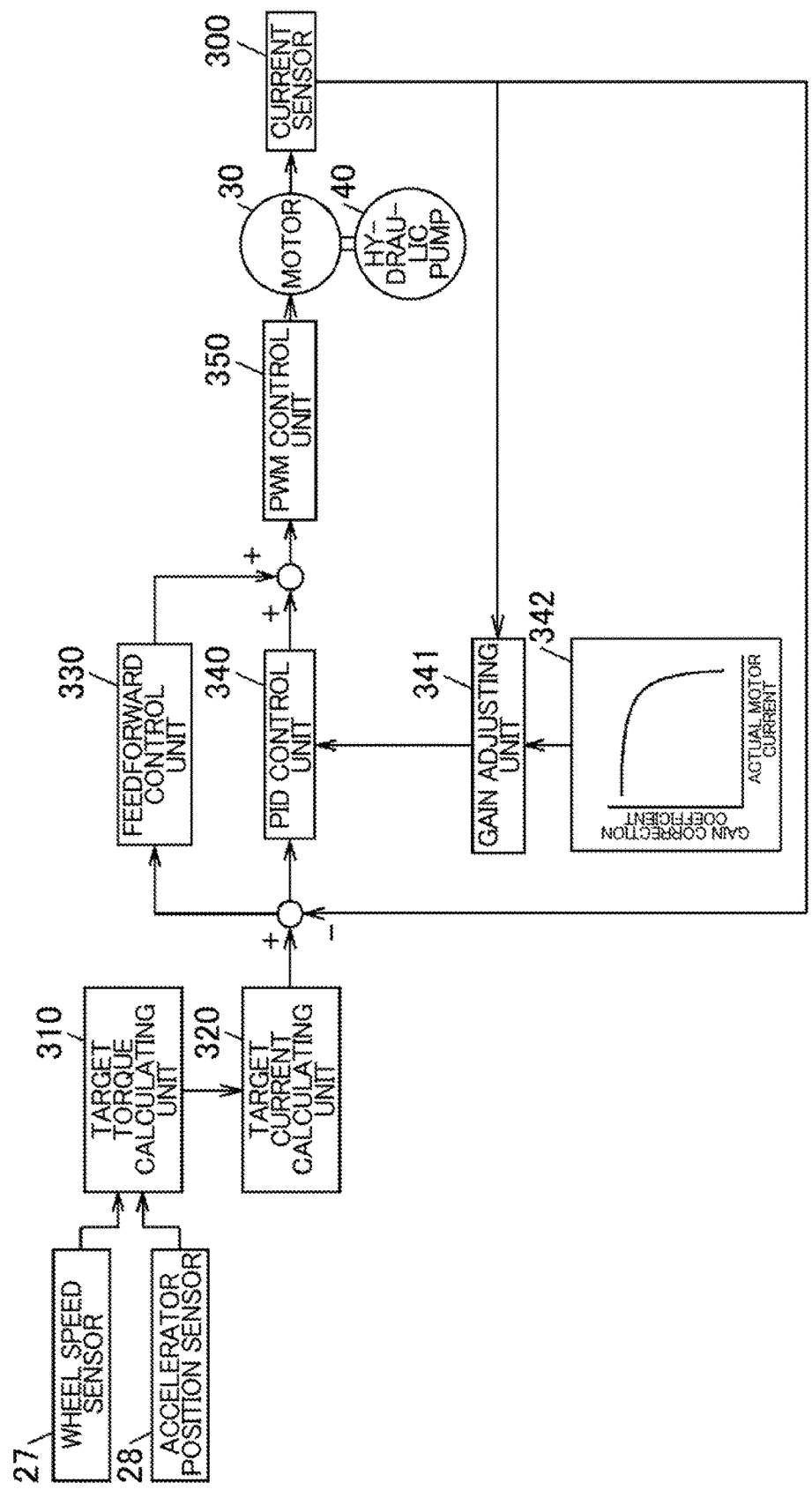
FIG. 5 is a control block diagram illustrating an example of the configuration of an electric motor control system.

The procedure of control carried out by the control apparatus 3 will be described below with reference to FIG. 5. FIG. 5 is a control block diagram illustrating an example of the configuration of a control system for the electric motor 30.

A target torque calculating unit 310 receives the values detected by the wheel speed sensor 27 and the accelerator position sensor 28. The target torque calculating unit 310 calculates a target torque that is the value of a torque to be transmitted by the first and second friction clutches 12A and 12B. The functions of the target torque calculating circuit 31 are implemented by the target torque calculating unit 310.

In accordance with the target torque calculated by the target torque calculating unit 310, a target current calculating unit 320 calculates a target current that is the current value of a motor current to be supplied to the electric motor 30. The functions of the target current calculating circuit 32 are implemented by the target current calculating unit 320.

On the basis of the target current calculated by the target current calculating unit 320, a feedforward control unit 330 calculates a command voltage that is a command value for a voltage to be applied to the electric motor 30. The functions of the feedforward control circuit 33 are implemented by the feedforward control unit 330.

A PID control unit 340 calculates a difference between the target current calculated by the target current calculating unit 320 and the actual current detected by the current sensor 300, and performs PID control so as to calculate a correction value that reduces the difference between the target current and the actual current. The PID control unit 340 adds the correction value to the command voltage calculated by the feedforward control unit 330. The correction value calculated by the PID control unit 340 may be positive or negative. Thus, the absolute value of the correction value is the amount of correction of a voltage to be applied to the electric motor 30.

In accordance with the actual current detected by the current sensor 300, a gain adjusting unit 341 adjusts feedback control gains for the PID control unit 340. The gain adjustment is performed on the basis of relationship information 342 stored in advance in a memory. The relationship information 342 indicates the relationship between the actual current (or actual motor current) supplied to the electric motor 30 and a gain correction coefficient. As illustrated in FIG. 5, the relationship is defined in the relationship information 342 such that the higher the actual motor current, the smaller the gain correction coefficient. The range of reduction in the gain correction coefficient increases as the actual motor current increases. Specifically, the degree of change in the gain correction coefficient with respect to a motor current within the range R1 including a rated motor current and somewhat smaller motor current is greater than the degree of change in the gain correction coefficient with respect to a motor current lower than the the range R1.

The relationship information 342 is defined in the form of a two-dimensional map, for example. The gain adjusting unit 341 multiplies each of the initial values of the proportional gain, the integral gain, and the derivative gain by the gain correction coefficient obtained with reference to the relationship information 342, thus performing a gain adjustment. The functions of the correction circuit 34 are implemented by the PID control unit 340 and the gain adjusting unit 341.

A PWM control unit 350 pulse-width modulates the voltage of the storage battery in accordance with the command voltage to which the correction value is added by the PID control unit 340 and thus applies a voltage responsive to the corrected command voltage to the electric motor 30. The functions of the voltage control circuit 35 are implemented by the PWM control unit 350.

Figure 6A:
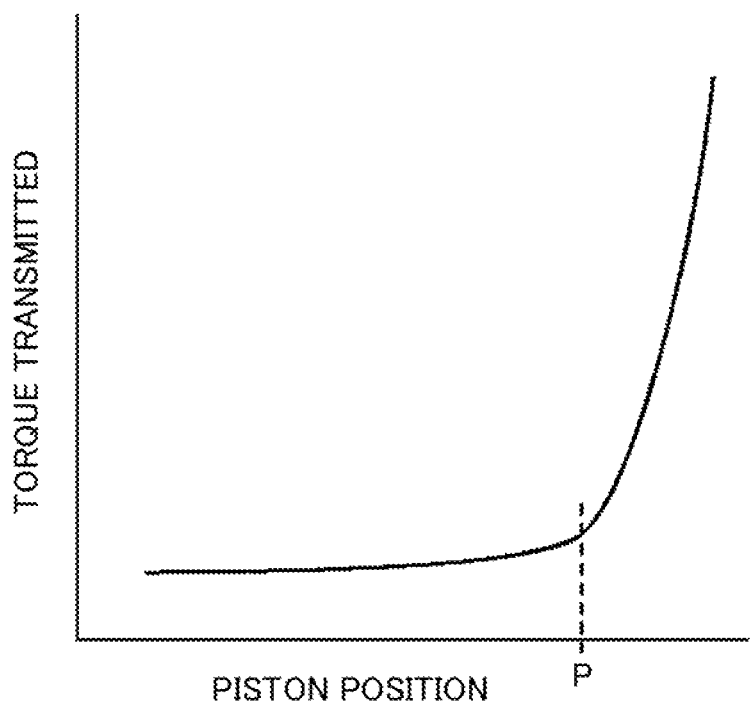
FIG. 6A is a graph illustrating the relationship between the position of each piston in an associated cylinder and the torque transmitted by the first and second friction clutches.
Figure 6B:
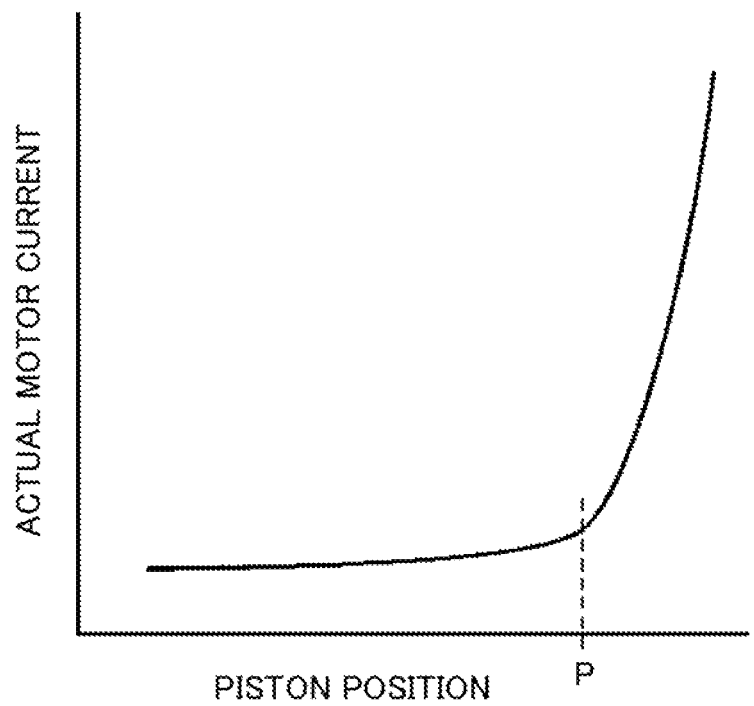
FIG. 6B is a graph illustrating the relationship between the piston position and actual motor current.

FIG. 6A is a graph illustrating the relationship between the axial position of each piston 122 in the associated cylinder 130d (i.e., the piston position) and the torque transmitted by the first and second friction clutches 12A and 12B. FIG. 6B is a graph illustrating the relationship between the piston position and the actual motor current. As the piston position moves rightward along the horizontal axis in FIGS. 6A and 6B, each piston 122 protrudes from the associated cylinder 130d and comes closer to the receiver 120b of the associated clutch housing 120.

With the hydraulic pump 40 not driven by the electric motor 30, each pressing member 123 is urged away from the receiver 120b of the associated clutch housing 120 by the associated coil spring 14. This creates gaps between the outer clutch plates 124 and the inner clutch plates 125 of each of the first and second friction clutches 12A and 12B. The gaps reduce drag torque caused by the viscosity of lubricating oil between the outer clutch plates 124 and the inner clutch plates 125.

In this state, the rotation of the electric motor 30 starts so as to cause the hydraulic pump 40 to discharge hydraulic oil. This increases the pressure inside each cylinder 130d, so that each piston 122 is pushed by the hydraulic oil and moved toward the receiver 120b of the associated clutch housing 120. In the initial stage of this movement, the gaps between the outer clutch plates 124 and the inner clutch plates 125 gradually narrow, and each piston 122 axially moves together with the associated pressing member 123 with a small force.

When no gaps are present between the outer clutch plates 124 and the inner clutch plates 125, the torque transmitted by the first and second friction clutches 12A and 12B and the actual motor current rise sharply as illustrated in FIGS. 6A and 6B. The reference sign P on the horizontal axis in the graph of each of FIGS. 6A and 6B indicates the piston position where the total of axial widths of the gaps between the outer clutch plates 124 and the inner clutch plates 125 is zero.

When the four-wheel drive vehicle 200 switches from the two-wheel drive state to the four-wheel drive state, the torque transmitted by the first and second friction clutches 12A and 12B of the driving force transmission device 1 preferably rises rapidly. After the four-wheel drive vehicle 200 has switched to the four-wheel drive state, the driving force necessary for the rear wheels 205R and 205L is preferably accurately transmitted thereto in accordance with, for example, a difference between the rotational speed of the front wheels 204R and 204L and the rotational speed of the rear wheels 205R and 205L, and the accelerator position.

Achieving a rapid rise in the torque transmitted by the first and second friction clutches 12A and 12B preferably involves: setting gains for feedback control effected by the correction circuit 34 at high levels; increasing acceleration at the start of the electric motor 30; and rapidly reducing the total of gaps between the outer clutch plates 124 and the inner clutch plates 125 to zero. Accurate adjustment of the torque transmitted by the first and second friction clutches 12A and 12B preferably involves setting gains for feedback control effected by the correction circuit 34 at low levels.

The inventors focused attention on the fact that the actual motor current increases when the total of gaps between the outer clutch plates 124 and the inner clutch plates 125 of each of the first and second friction clutches 12A and 12B is zero as illustrated in FIG. 6B. Thus, this embodiment involves increasing or reducing gains for feedback control (e.g., a proportional gain, an integral gain, and a derivative gain) in accordance with the actual motor current. Specifically, after the start of the electric motor 30, the gains are increased until no gaps are present between the outer clutch plates 124 and the inner clutch plates 125, and then the gains are reduced.

In other words, the correction circuit 34 increases the amount of correction of a voltage to be applied to the electric motor 30 as the distance between each pressing member 123 and the receiver 120b of the associated clutch housing 120 increases. The correction circuit 34 is configured so that the amount of correction of a voltage to be applied to the electric motor 30 when gaps are present between the outer clutch plates 124 and the inner clutch plates 125 is larger than the amount of correction of a voltage to be applied to the electric motor 30 when the total of gaps between the outer clutch plates 124 and the inner clutch plates 125 is zero.

Thus, the gains are set at high levels until the total of gaps between the outer clutch plates 124 and the inner clutch plates 125 of each of the first and second friction clutches 12A and 12B is zero, the acceleration at the start of the electric motor 30 is increased, and the process of reducing the gaps between the outer clutch plates 124 and the inner clutch plates 125 to zero is finished in a short time. After the total of gaps between the outer clutch plates 124 and the inner clutch plates 125 of each of the first and second friction clutches 12A and 12B has been reduced to zero and the torque transmitted by the first and second friction clutches 12A and 12B has risen, the gains are set at low levels. Consequently, the torque transmitted is controlled with high accuracy Accordingly, this embodiment controls the driving force to be transmitted with high accuracy while preventing a reduction in responsiveness of the driving force transmission device 1.

Figure 7:
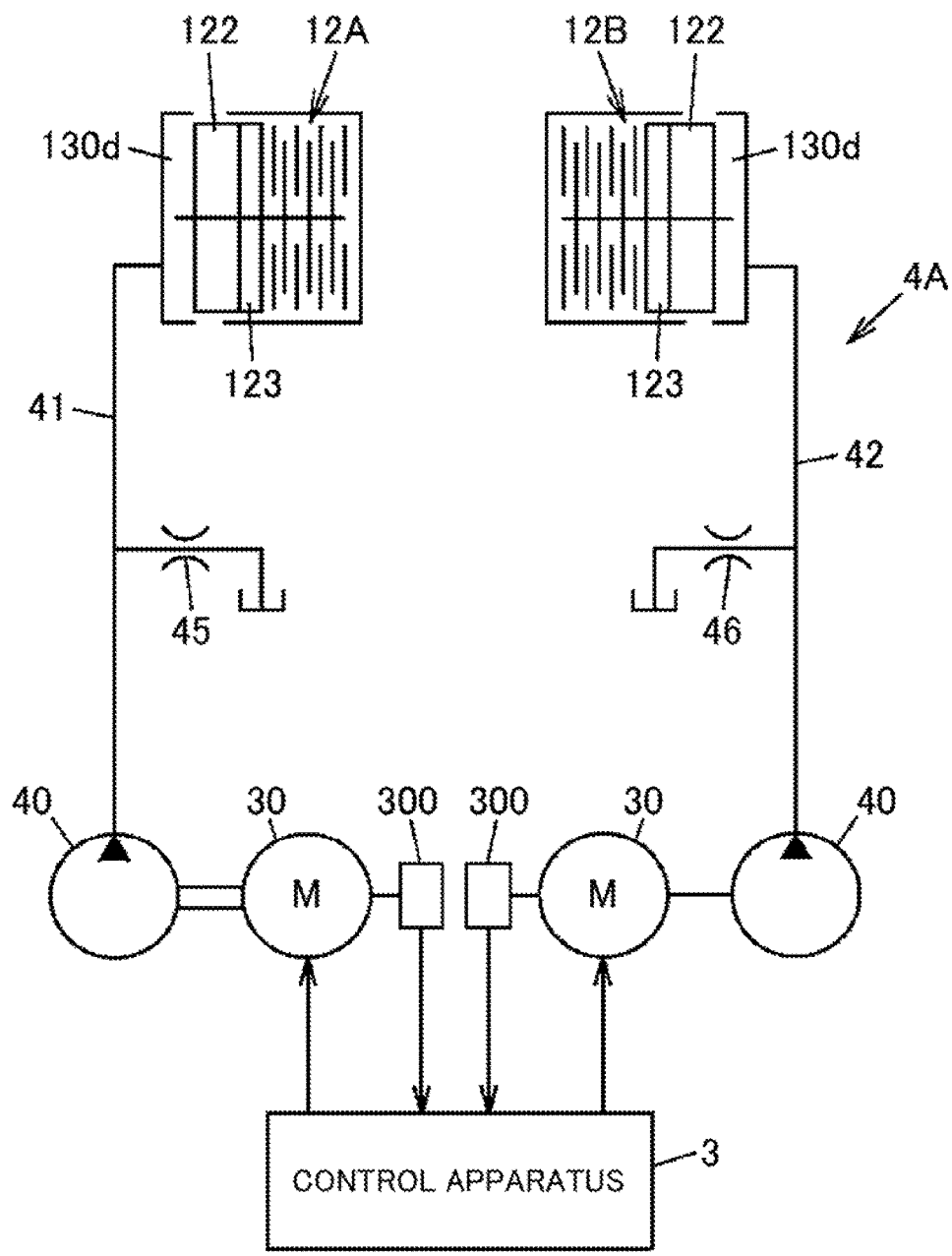
FIG. 7 is a diagram schematically illustrating the configurations of the control apparatus and the hydraulic circuit according to a variation of the first embodiment.

A variation of the first embodiment will be described below. FIG. 7 is a diagram schematically illustrating the configurations of the control apparatus 3 and the hydraulic circuit 4 according to the variation of the first embodiment.

The driving force transmission device 1 according to this variation includes first and second electric motors 30, and first and second hydraulic pumps 40. The first friction clutch 12A is actuated by the first electric motor 30 and the first hydraulic pump 40. The second friction clutch 12B is actuated by the second electric motor 30 and the second hydraulic pump 40. The first pipe 41 between the first hydraulic pump 40 and the cylinder 130d associated with the first friction clutch 12A is provided with a fixed restrictor 45. The second pipe 42 between the second hydraulic pump 40 and the cylinder 130d associated with the second friction clutch 12B is provided with a fixed restrictor 46.

The control apparatus 3 controls each electric motor 30 by a control method similar to that performed in the above-described first embodiment. Hydraulic oil is fed to each cylinder 130d at a pressure responsive to the number of revolutions of the associated electric motor 30. The first and second friction clutches 12A and 12B each transmit a driving force responsive to the pressure of the hydraulic oil supplied to the associated cylinder 130d.

This variation also achieves effects similar to those of the first embodiment.

A second embodiment of the invention will be described below with reference to FIGS. 8 to 10.

Figure 8:
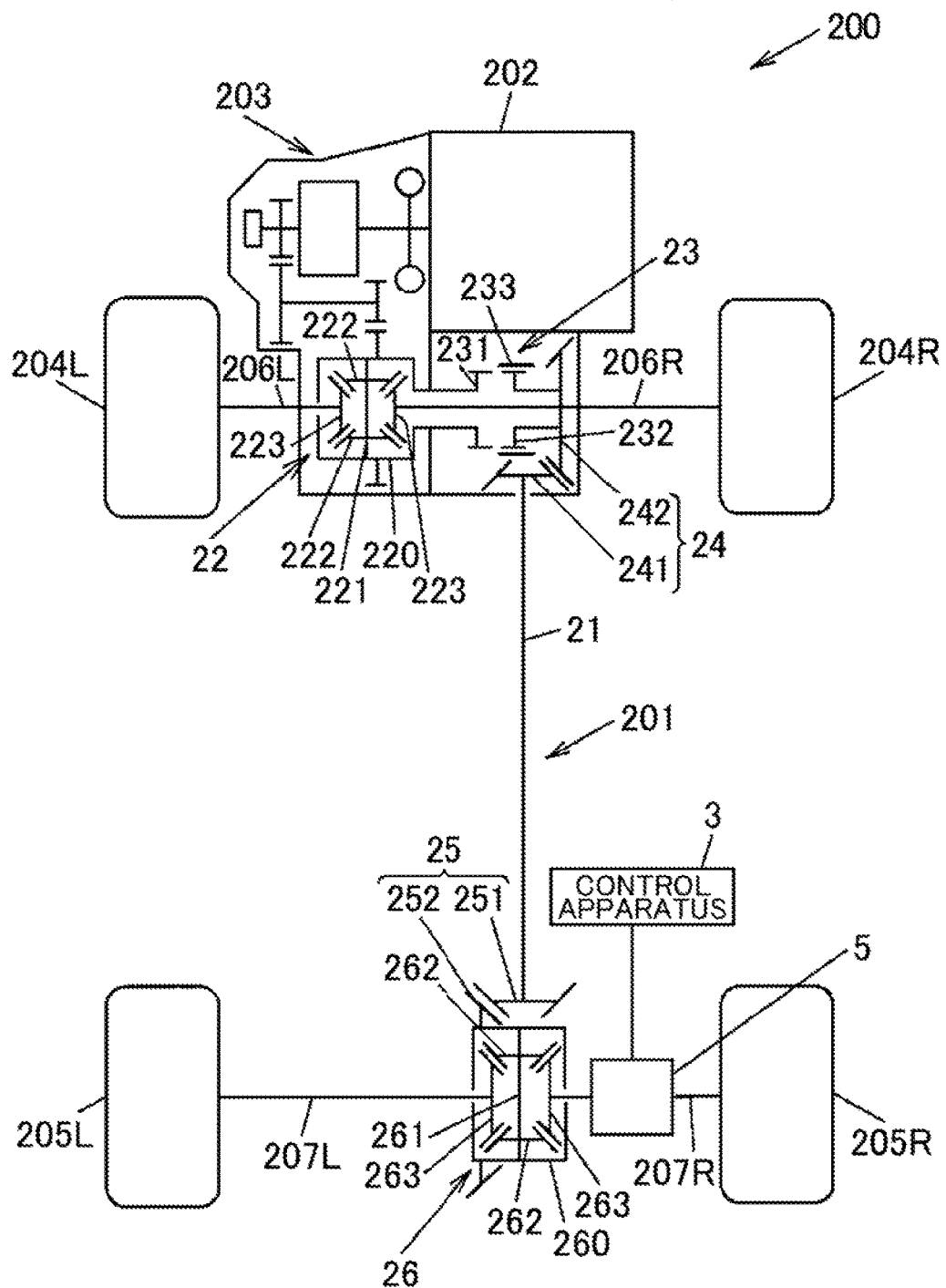
FIG. 8 is a diagram illustrating a schematic configuration of a four-wheel drive vehicle equipped with a driving force transmission device control apparatus according to a second embodiment of the invention.

FIG. 8 is a schematic diagram illustrating the configuration of the four-wheel drive vehicle 200 equipped with a driving force transmission device 5 according to the second embodiment of the invention. In FIG. 8, components corresponding to those described in the first embodiment are identified by the same reference signs as those used in the first embodiment, and description thereof will be omitted as unnecessary.

In this embodiment, the driving force transmission device 5 is disposed between the rear wheel axle shaft 207R and a rear differential 26. The rear differential 26 includes: a rear differential case 260; a pinion shaft 261 that rotates together with the rear differential case 260; a pair of pinion gears 262 pivotally supported by the pinion shaft 261; and a pair of side gears 263 intermeshing with the pair of pinion gears 262, with the gear axes of the side gears 263 perpendicular to the gear axes of the pinion gears 262. A rear wheel gear mechanism 25 is disposed on the rear wheel side end of the propeller shaft 21. The gear mechanism 25 includes a drive pinion 251 and a ring gear 252 intermeshing with each other. The drive pinion 251 is connected to the rear end of the propeller shaft 21. The ring gear 252 is secured to the rear differential case 260.

The driving force transmission device 5 is controlled by the control apparatus 3 so as to transmit a driving force between the axle shaft 207R and the right one of the pair of side gears 263. The rear differential 26 performs a differential function so that a driving force equal or substantially equal to the driving force transmitted to the axle shaft 207R is transmitted to the axle shaft 207L connected to the left side gear 263.

Figure 9:
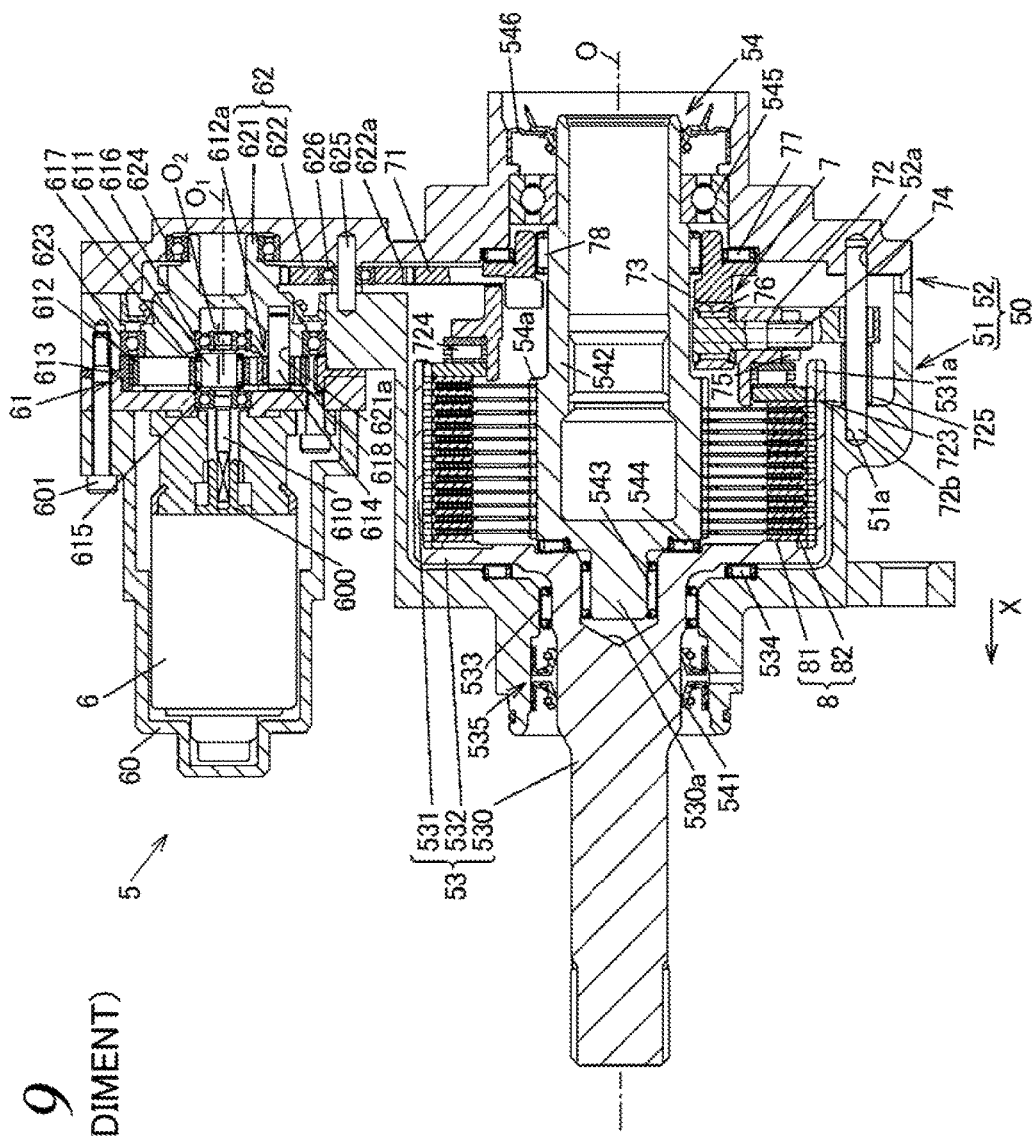
FIG. 9 is a cross-sectional view of an example of the structure of the driving force transmission device according to the second embodiment.

FIG. 9 is a cross-sectional view of an example of the structure of the driving force transmission device 5. The portion of FIG. 9 above the rotation axis O illustrates a non-operating state, and the portion of the FIG. 9 below the rotation axis O illustrates an operating-state.

The driving force transmission device 5 includes: an electric motor 6; a decelerating mechanism 61 to decelerate rotation of an output shaft 600 of the electric motor 6; a friction clutch 8 including a plurality of outer clutch plates 81 and a plurality of inner clutch plates 82 that are col-linearly disposed so as to be rotatable relative to each other and are configured to be pressed in the direction parallel to the rotation axis O so as to be brought into frictional engagement with each other; an outer rotary member 53 that rotates together with the outer clutch plates 81; an inner rotary member 54 that rotates together with the inner clutch plates 82; a cam mechanism 7 to produce, upon receiving a rotary driving force from the electric motor 6, a cam thrust that presses the friction clutch 8 in the direction parallel to the rotation axis O; and a housing 50 including a body 51 and a lid 52. Lubricating oil (not illustrated) is sealed in the housing 50 so as to facilitate frictional sliding of the outer clutch plates 81 and the inner clutch plates 82.

The outer rotary member 53 integrally includes: a shaft portion 530 whose axis corresponds to the rotation axis O; a cylindrical portion 531 having an opening facing in the direction opposite to the shaft portion 530 (i.e., facing toward the cam mechanism 7); and a bottom 532 provided between the shaft portion 530 and the cylindrical portion 531. The bottom 532 functions as a receiver to receive a pressing force from the cam mechanism 7 through the friction clutch 8. The outer rotary member 53 is rotatably supported inside the body 51 of the housing 50 via needle roller bearings 533 and 534. The shaft portion 530 is connected to the right side gear 263 of the rear differential 26 (see FIG. 8) by spline fitting. A portion of the driving force transmission device 5 between the outer peripheral surface of the shaft portion 530 and the inner surface of the body 51 of the housing 50 is sealed with a seal 535.

The inner rotary member 54 integrally includes: a shaft-like boss 541 whose axis corresponds to the rotation axis O;

and a bottomed cylindrical portion 542 having an opening facing in the direction opposite to the boss 541. The inner rotary member 54 is rotatably supported inside the cylindrical portion 531 of the outer rotary member 53 via needle roller bearings 543 and 544. The inner rotary member 54 is rotatably supported by the lid 52 of the housing 50 via a ball bearing 545. The front end of the axle shaft 207R is inserted into the inner rotary member 54 through its opening. The axle shaft 207R is connected to the inner rotary member 54 by spline fitting such that the axle shaft 207R is not rotatable relative to the inner rotary member 54 but is movable relative to the inner rotary member 54 along the rotation axis O. The boss 541 is housed in a recess 530a defined in an end of the shaft portion 530 of the outer rotary member 53 adjacent to the cylindrical portion 531. A portion of the driving force transmission device between the outer peripheral surface of the cylindrical portion 542 adjacent to its opening and the inner surface of the lid 52 of the housing 50 is sealed with a seal 546.

The friction clutch 8 is disposed between the outer rotary member 53 and the inner rotary member 54. The outer clutch plates 81 and the inner clutch plates 82 are disposed alternately along the rotation axis O so as to be rotatable relative to each other. The outer clutch plates 81 are spline-fitted to a straight spline-fitted portion 531a on the inner peripheral surface of the cylindrical portion 531 of the outer rotary member 53. Thus, the outer clutch plates 81 are connected to the outer rotary member 53 such that the outer clutch plates 81 are not rotatable relative to the outer rotary member 53 but are movable relative to the outer rotary member 53 along the rotation axis O.

The inner clutch plates 82 are spline-fitted to a straight spline-fitted portion 54a on the outer peripheral surface of the cylindrical portion 542 of the inner rotary member 54. Thus, the inner clutch plates 82 are connected to the inner rotary member 54 such that the inner clutch plates 82 are not rotatable relative to the inner rotary member 54 but are movable relative to the inner rotary member 54 along the rotation axis O.

The electric motor 6 is housed in a motor housing 60. The motor housing 60 is attached to the body 51 of the housing 50 with a bolt 601. The output shaft 600 of the electric motor 6 is connected to the cam mechanism 7 via the decelerating mechanism 61 and a gear transmission mechanism 62.

The gear transmission mechanism 62 includes a first gear 621 and a second gear 622. The first gear 621 is disposed on the axis of the decelerating mechanism 61. The first gear 621 is rotatably supported inside the body 51 of the housing 50 via ball bearings 623 and 624. The second gear 622 is disposed so that its gear portion 622a intermeshes with the first gear 621. The second gear 622 is rotatably supported by a support shaft 625 via a ball bearing 626. The gear transmission mechanism 62 transmits the rotational force of the electric motor 6 decelerated by the decelerating mechanism 61 to the cam mechanism 7.

The decelerating mechanism 61 is an eccentric oscillating decelerating mechanism. The decelerating mechanism 61 includes: a rotation shaft member 610 connected to the output shaft 600 of the electric motor 6 such that the rotation shaft member 610 is not rotatable relative to the output shaft 600; an eccentric portion 611 whose central axis corresponds to an axis $O_2$ offset from an axis $O_1$ of the rotation shaft member 610 by a predetermined eccentricity; an input member 612 including an external gear having a central hole that houses the eccentric portion 611; a rotation force provider 613 including an internal gear whose central axis corresponds to the axis $O_1$; and a plurality of output members 614 to receive, from the input member 612, the rotation force provided by the rotation force provider 613 and output the rotation force to the first gear 621 of the gear transmission mechanism 62. Only one of the output members 614 is illustrated in FIG. 9.

The rotation shaft member 610 is rotatably supported by ball bearings 615 and 616. The rotation shaft member 610 is inserted through the eccentric portion 611. The eccentric portion 611 rotates together with the rotation shaft member 610. The eccentric portion 611 eccentrically rotates around the axis $O_1$. A needle roller bearing 617 is interposed between the outer peripheral surface of the eccentric portion 611 and the inner peripheral surface of the central hole of the input member 612. The input member 612 is provided with a plurality of through holes 612a disposed circumferentially at regular intervals. Each output member 614 is inserted through the associated through hole 612a. Only one of the through holes 612a is illustrated in FIG. 9. A needle roller bearing 618 is interposed between the outer peripheral surface of each output member 614 and the inner peripheral surface of each through hole 612a.

The pitch circle diameter of the internal gear of the rotation force provider 613 is larger than the pitch circle diameter of the external gear of the input member 612. The rotation force provider 613 intermeshes with a portion of the input member 612 that rotates eccentrically, thus providing the rotation force to the input member 612. The output members 614 are inserted through the through holes 612a of the input member 612 and attached to pin attachment holes 621a of the first gear 621 of the gear transmission mechanism 62. The output members 614 receive, from the input member 612, the rotation force provided by the rotation force provider 613 and output the rotation force to the first gear 621 of the gear transmission mechanism 62.

A plurality of (e.g., three) guides 72b are disposed between the body 51 and the lid 52 of the housing 50 such that the guides 72b are parallel to the rotation axis O. Each guide 72b has a columnar shape. One axial end of each guide 72b is fitted and secured to a retaining hole 51a in the body 51. The other axial end of each guide 72b is fitted and secured to a retaining hole 52a in the lid 52. A return spring 725 is fitted onto each guide 72b. Each return spring 725 serves as an urging member to axially urge a retainer 72 of the cam mechanism 7 (which will be described below). Each return spring 725 is a coil spring disposed between the body 51 and the retainer 72, with the coil spring axially compressed therebetween. The restoring force of each return spring 725 elastically presses the retainer 72 toward the lid 52.

Figure 10:
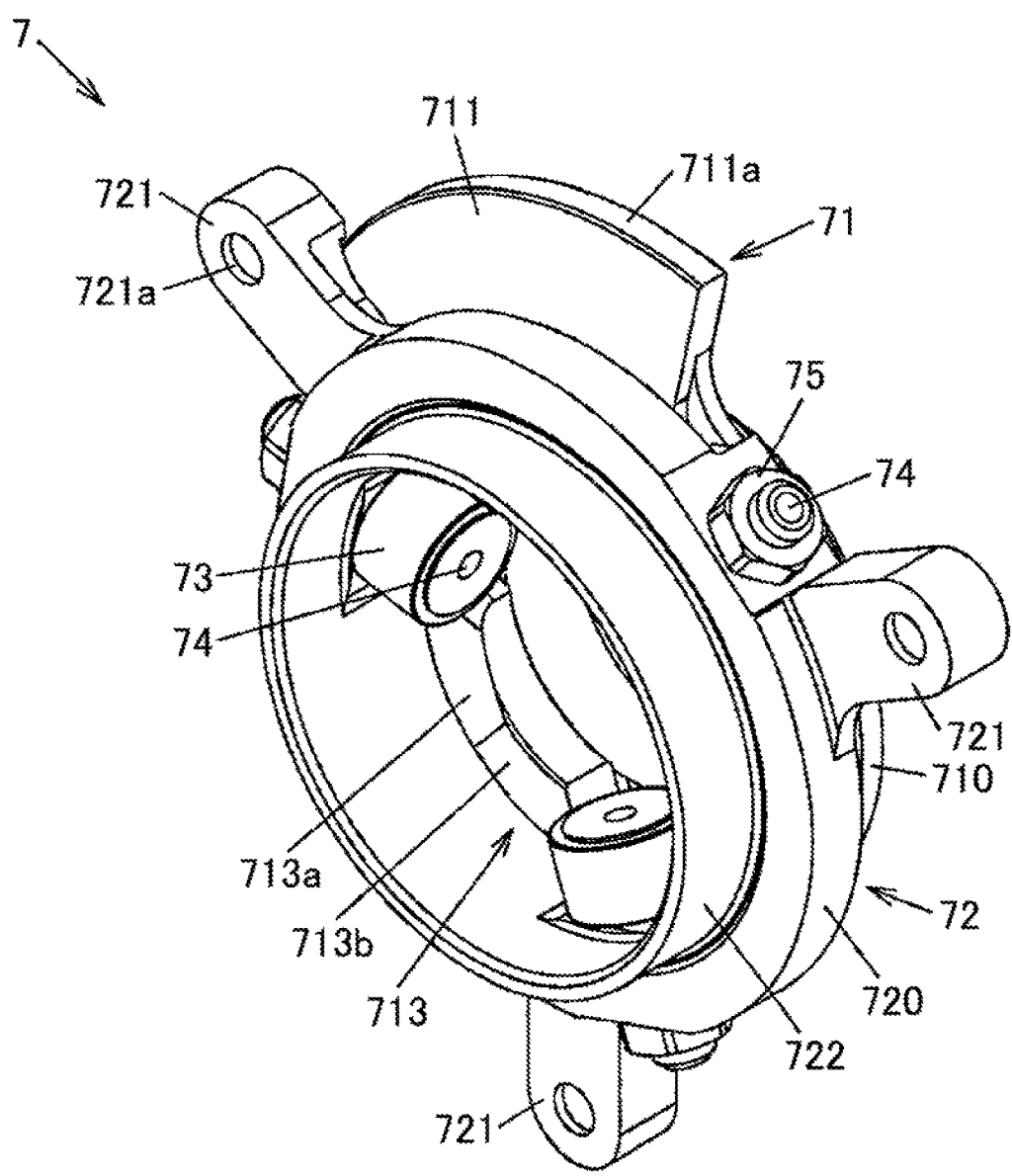
FIG. 10 is a perspective view of a cam mechanism.

FIG. 10 is a perspective view of the cam mechanism 7. Upon receiving the rotary driving force from the electric motor 6, the cam mechanism 7 produces a thrust that presses the friction clutch 8 along the rotation axis O. In other words, the cam mechanism 7 converts the rotary driving force generated by the electric motor 6 into an axial pressing force that causes the outer clutch plates 81 and the inner clutch plates 82 of the friction clutch 8 to come into frictional engagement with each other. The cam mechanism 7 is an example of a "pressing mechanism" according to the invention.

The cam mechanism 7 includes: a cam member 71 provided with cam surfaces 713a; a plurality of rolling members 73 that roll on the cam surfaces 713a; and the retainer 72 serving as a movable member that is axially moved by the rolling of the rolling members 73. The retainer 72 is disposed closer to the friction clutch 8 than the cam member 71. The rolling members 73 are disposed inward of the retainer 72.

The cam member 71 integrally includes: an annular base 710 that has a predetermined thickness along the rotation axis O and allows the inner rotary member 54 to be inserted therethrough; a fan-like projection 711 projecting outward from a portion of the outer peripheral surface of the base 710; and a plurality of (e.g., three) arc-shaped protrusions 713 protruding from a first axial end face of the base 710 toward the friction clutch 8.

As illustrated in FIG. 10, the retainer 72 integrally includes: an annular retainer base 720 that has a predetermined thickness along the rotation axis O and allows the inner rotary member 54 to be inserted therethrough; a plurality of (e.g., three) projections 721 each projecting outward from a portion of the outer peripheral surface of the retainer base 720; and a cylindrical tubular portion 722 protruding from an end face of the retainer base 720 facing toward the friction clutch 8.

The retainer base 720 is provided with a plurality of (e.g., three) radially extending pin insertion holes. Support pins 74 are inserted into the pin insertion holes so as to support the rolling members 73. A first end of each support pin 74 protruding outward of the retainer base 720 is screwed to a nut 75, so that each support pin 74 is secured to the retainer 72. Each rolling member 73 has a cylindrical shape. A plurality of needle rollers 76 (see FIG. 9) are disposed between the inner peripheral surface of each rolling member 73 and the outer peripheral surface of a second end (or inner end) of each support pin 74.

The projections 721 are each provided with a guide insertion hole 721a through which the associated guide 72b is to be inserted. The insertion of each guide 72b through the associated guide insertion hole 721a restricts rotation of the retainer 72 relative to the housing 50 but allows axial movement of the retainer 72. Each return spring 725 abuts against an end face of a portion of the projection 721 adjacent to the associated guide insertion hole 721a.

An annular pressing member 723 (see FIG. 9) is disposed on the outer periphery of the tubular portion 722. Upon receiving a thrust from the retainer 72, the pressing member 723 presses the friction clutch 8. The pressing member 723 is connected to the straight spline-fitted portion 531a on the cylindrical portion 531 of the outer rotary member 53 by spline fitting such that the pressing member 723 is not rotatable relative to the outer rotary member 53 but is axially movable relative to the outer rotary member 53. A needle roller bearing 724 is interposed between an end face of the pressing member 723 and an end face of the retainer base 720 of the retainer 72 facing toward the friction clutch 8.

The outer peripheral surface of the fan-like projection 711 integral with the base 710 of the cam member 71 is provided with a gear portion 711a that intermeshes with the gear portion 622a of the second gear 622 of the gear transmission mechanism 62. Upon receiving through the gear transmission mechanism 62 the rotational force of the electric motor 6 decelerated by the decelerating mechanism 61, the cam member 71 rotates within a predetermined angle range.

A needle roller bearing 78 is interposed between the inner peripheral surface of the base 710 of the cam member 71 and the outer peripheral surface of the cylindrical portion 542 of the inner rotary member 54. A needle roller bearing 77 is disposed on the outer periphery of the base 710. The needle roller bearing 77 is interposed between a second axial end face of the base 710 and the inner surface of the lid 52 of the housing 50.

The protrusions 713 of the cam member 71 have the same shape. Each protrusion 713 includes first and second ends in the circumferential direction of the cam member 71. The first end of each protrusion 713 is provided with the cam surface 713a inclined relative to the circumferential direction of the cam member 71. The second end of each protrusion 713 is provided with a flat surface 713b parallel to the circumferential direction of the cam member 71.

Rotation of the cam member 71 relative to the retainer 72 causes the rolling members 73 to roll on the cam surfaces 713a. The rolling of the rolling members 73 causes axial movement of the retainer 72. Thus, the cam mechanism 7 produces the pressing force that presses the friction clutch 8.

The control apparatus 3 for controlling the driving force transmission device 5 configured as described above is similar to the control apparatus 3 according to the first embodiment except that no electromagnetic valve control circuit 36 is provided. The control apparatus 3 according to the second embodiment controls the driving force transmission device 5 by a control method similar to that performed in the first embodiment. The control apparatus 3 according to the second embodiment calculates a target current to be supplied to the electric motor 6, and corrects a voltage to be applied to the electric motor 6 so as to reduce a difference between the target current and an actual current supplied to the electric motor 6. In correcting the voltage to be applied to the electric motor 6, the control apparatus 3 increases or reduces, in accordance with the actual current supplied to the electric motor 6, the amount of correction of the voltage to be applied to the electric motor 6. Specifically, the control apparatus 3 according to the second embodiment increases gains for feedback control as the actual current supplied to the electric motor 6 decreases.

Also in the second embodiment, the process of reducing the gaps between the outer clutch plates 81 and the inner clutch plates 82 to zero is finished in a short time similarly to the first embodiment. After the torque transmitted by the friction clutch 8 has risen, the gains are set at low levels. Consequently, the torque transmitted is controlled with high accuracy.

Accordingly, the second embodiment also controls the driving force to be transmitted with high accuracy while preventing a reduction in responsiveness of the driving force transmission device 5.

What is claimed is:

1. An apparatus for controlling a driving force transmission device,
the driving force transmission device including
an electric motor,
a pressing mechanism to convert a rotational force of the electric motor into an axial pressing force, and
a friction clutch including a plurality of friction members configured to come into frictional engagement with each other by the pressing force provided by the pressing mechanism,
the driving force transmission device being configured to transmit a driving force between a pair of first and second rotary members by the friction clutch,
the apparatus comprising:
a target current calculating circuit to calculate a target current to be supplied to the electric motor; and
a correction circuit to correct a voltage to be applied to the electric motor so as to reduce a difference between the target current and an actual current supplied to the electric motor, wherein the correction circuit increases or reduces, in accordance with the actual current supplied to the electric motor, an amount of correction of the voltage to be applied to the electric motor.

2. The apparatus according to claim 1, wherein the correction circuit increases the amount of correction of the voltage to be applied to the electric motor as the actual current supplied to the electric motor decreases.

3. The apparatus according to claim 1, wherein
the pressing mechanism includes a pressing member configured to move axially so as to press the friction clutch,
the first rotary member is provided with a receiver to receive the pressing force from the pressing mechanism through the friction clutch, and
the correction circuit increases the amount of correction of the voltage to be applied to the electric motor as a distance between the pressing member and the receiver increases.

4. The apparatus according to claim 1, wherein
the plurality of friction members of the friction clutch include
　a first friction member connected to the first rotary member such that the first friction member is not rotatable relative to the first rotary member, and
　a second friction member connected to the second rotary member such that the second friction member is not rotatable relative to the second rotary member, and
the correction circuit is configured so that the amount of correction of the voltage to be applied to the electric motor when a gap is present between the first and second friction members is larger than the amount of correction of the voltage to be applied to the electric motor when no gap is present between the first and second friction members.

5. The apparatus according to claim 1, wherein the correction circuit increases or reduces a gain for feedback control in accordance with the actual current supplied to the electric motor.

6. The apparatus according to claim 1, wherein
the pressing mechanism includes
　a pump to be driven by the electric motor so as to discharge a working fluid, and
　a piston housed in a cylinder to be supplied with the working fluid, and
the piston moves through the cylinder so as to provide the pressing force to the friction clutch.

7. The apparatus according to claim 6, further comprising:
an electromagnetic valve control circuit to control an electromagnetic valve, wherein
the electromagnetic valve is disposed in a pipe between the pump and the cylinder,
the electromagnetic valve is configured to adjust a pressure of the working fluid, and
the electromagnetic valve is included in the pressing mechanism.

8. The apparatus according to claim 1, wherein
the pressing mechanism includes
　a cam member configured to rotate in accordance with the rotational force of the electric motor, and
　a movable member configured to move axially in accordance with the rotation of the cam member.

9. A method for controlling a driving force transmission device,
the driving force transmission device including
　an electric motor,
　a pressing mechanism to convert a rotational force of the electric motor into an axial pressing force, and
　a friction clutch including a plurality of friction members configured to come into frictional engagement with each other by the pressing force provided by the pressing mechanism,
the driving force transmission device being configured to transmit a driving force between a pair of rotary members by the friction clutch,
the method comprising:
a) calculating a target current to be supplied to the electric motor; and
b) correcting a voltage to be applied to the electric motor so as to reduce a difference between the target current and an actual current supplied to the electric motor, wherein
step b) involves increasing or reducing, in accordance with the actual current supplied to the electric motor, an amount of correction of the voltage to be applied to the electric motor.

* * * * *